US008600662B2

(12) United States Patent
Clark (10) Patent No.: US 8,600,662 B2
(45) Date of Patent: Dec. 3, 2013

(54) METHOD AND SYSTEM FOR PLOTTING A USER'S POSITION ON A DISPLAY (76) Inventor: Nicholas Clark, Woodinville, WA (US)

(*) Notice: Subject to any disclaimer, the term of this patent is extended or adjusted under 35 U.S.C. 154(b) by 1033 days.

(21) Appl. No.: 12/276,162

(22) Filed: Nov. 21, 2008

(65) Prior Publication Data

US 2010/0131192 A1 May 27, 2010

(51) Int. Cl.
G01C 21/30 (2006.01)
(52) U.S. Cl.
USPC ......... 701/409; 455/435.1; 702/150; 715/718
(58) Field of Classification Search
USPC ............... 701/41, 202, 207, 208, 409; 463/2; 455/435.1; 715/718; 702/150
See application file for complete search history.

(56) References Cited

U.S. PATENT DOCUMENTS

| | | | |
|---|---|---|---|
| 5,347,295 A * | 9/1994 | Agulnick et al. | 345/156 |
| 5,438,518 A | 8/1995 | Bianco | |
| 5,513,854 A | 5/1996 | Daver | |
| 6,080,063 A | 6/2000 | Khosla | |
| 6,320,495 B1 | 11/2001 | Sporgis | |
| 6,520,853 B2 | 2/2003 | Suzuki | |
| 6,691,032 B1 | 2/2004 | Irish | |
| 6,816,184 B1 * | 11/2004 | Brill et al. | 348/143 |
| 6,895,238 B2 | 5/2005 | Newell | |
| 7,005,970 B2 | 2/2006 | Hodsdon | |
| 2002/0183961 A1 * | 12/2002 | French et al. | 702/150 |
| 2003/0191547 A1 * | 10/2003 | Morse | 700/91 |
| 2003/0224855 A1 | 12/2003 | Cunningham | |
| 2004/0236507 A1 * | 11/2004 | Maruyama et al. | 701/208 |
| 2007/0155453 A1 * | 7/2007 | Fujioka et al. | 463/2 |
| 2007/0281689 A1 * | 12/2007 | Altman et al. | 455/435.1 |
| 2008/0162034 A1 * | 7/2008 | Breen | 701/202 |
| 2008/0163057 A1 * | 7/2008 | Lohi et al. | 715/718 |
| 2008/0293432 A1 * | 11/2008 | Stewart et al. | 455/456.1 |
| 2009/0055091 A1 * | 2/2009 | Hines et al. | 701/207 |
| 2009/0064012 A1 * | 3/2009 | Tremblay | 715/764 |
| 2009/0118904 A1 * | 5/2009 | Birnie | 701/41 |
| 2009/0326815 A1 * | 12/2009 | Williamson et al. | 701/212 |

* cited by examiner

Primary Examiner — Thomas Black
Assistant Examiner — Shardul Patel
(74) Attorney, Agent, or Firm — Paul M. Sykes; Nicholas J. Landau; Bradley Arant Boult Cummings LLP (57) ABSTRACT A method and system for showing a user his position in a set geographic area in which all parts of the geographic area are visible on a display at all times, and in which the user's position is shown as moveable relative to the set geographic area. The method and system utilize a positioning system (such as GPS) on the user and a display visible to the user to track and display the user's movement. In some versions the user defines the geographic area by positioning himself at the edges of the area. In other versions the user marks the geographic area on a map or chart on the display. In this way the user will always know his position relative to the same boundaries, without the need for zooming or scrolling the display.

32 Claims, 6 Drawing Sheets

METHOD AND SYSTEM FOR PLOTTING A USER'S POSITION ON A DISPLAY

BACKGROUND

A. Field of the Disclosure

The field of the instant disclosure is methods and systems for representing a user's position on a display visible to the user based on the user's real-world position.

B. Background of the Art

Methods of representing a user's geographic position on a display have until now been limited to three major classes: those in which the user views the display, and in which the user is always represented at the center of the display and in which the user's environment constantly scrolls to portray movement; those in which the user views the display, and in which the user's position on the display may vary and in which the user's environment periodically scrolls to portray movement; and those in which the user does not view the display. These methods all have inherent disadvantages.

If the user is always portrayed at the center of the display, the user may have difficulty with orientation. The user may not be able to determine his position relative to known landmarks. If the method orients the portrayal of the user's environment based on the user's heading, it is difficult for the user to determine the cardinal directions from the display (unless these are expressly marked).

Regardless of whether the user is always portrayed at the center of the display, the scrolling screen has the disadvantage that the user cannot see objects in the environment in area to which the screen has not yet scrolled. If the user's position is not fixed on the screen, this virtual horizon will change in its distance from the user, further complicating orientation and navigation.

The lack of defined boundaries of the field of the display poses inherent difficulties in orientation to the human user. It creates a virtual environment in which the user's position cannot be determined without reference to landmarks on the display. The user's position cannot be determined simply from looking at the user's position on the display, because the user's position on the display is either always in the center or jumps wildly from edge to edge or edge to center. Of course, in methods in which the user's position is represented on a display not visible to the user, the method is useless to the user in orientation and navigation.

Moreover, there may be certain instances in which the geographic area of interest is fixed or limited. In such instances, it may be disadvantageous for the display to scroll and advantageous for the entire geography of interest to be viewable on the display. For example, if the geography is a region with specific objects and/or other users who are also displayed or tracked by the system to which the display is in communication, it may be particularly advantageous to display the entire geography, with all relevant objects, on the display without scrolling so the user may view all of the relevant surroundings.

SUMMARY

The disclosure provides an improved method of representing a user's position on a display visible to the user, in which the display represents a real region having fixed boundaries, and in which the user's apparent position on the display changes as the user moves about the region. The user's position is represented within a certain defined zone of the display, such that the display need not scroll to represent the user's position. The method can further comprise the definition of the boundaries of the region wherein the user "marks" the boundaries by positioni himself at a plurality of points in the region. The user's position is determined using a locating device, including a GPS receiver.

The disclosure also provides a system for representing a position of a user in a region having constant geographical boundaries on a zone of a display, as in the method above. In some embodiments, the system comprises a display visible to the user; a display controller capable of rendering a virtual position of the user on the display; a locating device for determining a geographic position of the user; a processor in communication with the locating device wherein the processor is programmed to perform the steps of: (1) determining the virtual position of the user as a function of the geographic position communicated by the locating device; (2) causing the display controller to render the virtual position on the display; and (3) defining a virtual boundary of a fixed zone of the display corresponding to the constant geographic boundaries of the region.

The system and the method have numerous potential applications, including serving as a user-interface for programs in the areas of games, art, athletics, physical testing, mental testing, navigation, combat, law enforcement and business administration.

DETAILED DESCRIPTION

A. Definitions

The term "including" as used herein is non-exclusive, and can be read to mean "including but not limited to."

The term "region" as used herein refers to any geographical area or volume,

The term "virtual position" as used herein refers to a position on a display, plotted or unplotted.

The term "locating device" refers to any geographical locating device, regardless of whether it receives a signal or needs to receive a signal in the process of determining its location, and includes a GPS receiver.

B. Methods

Figure 1:
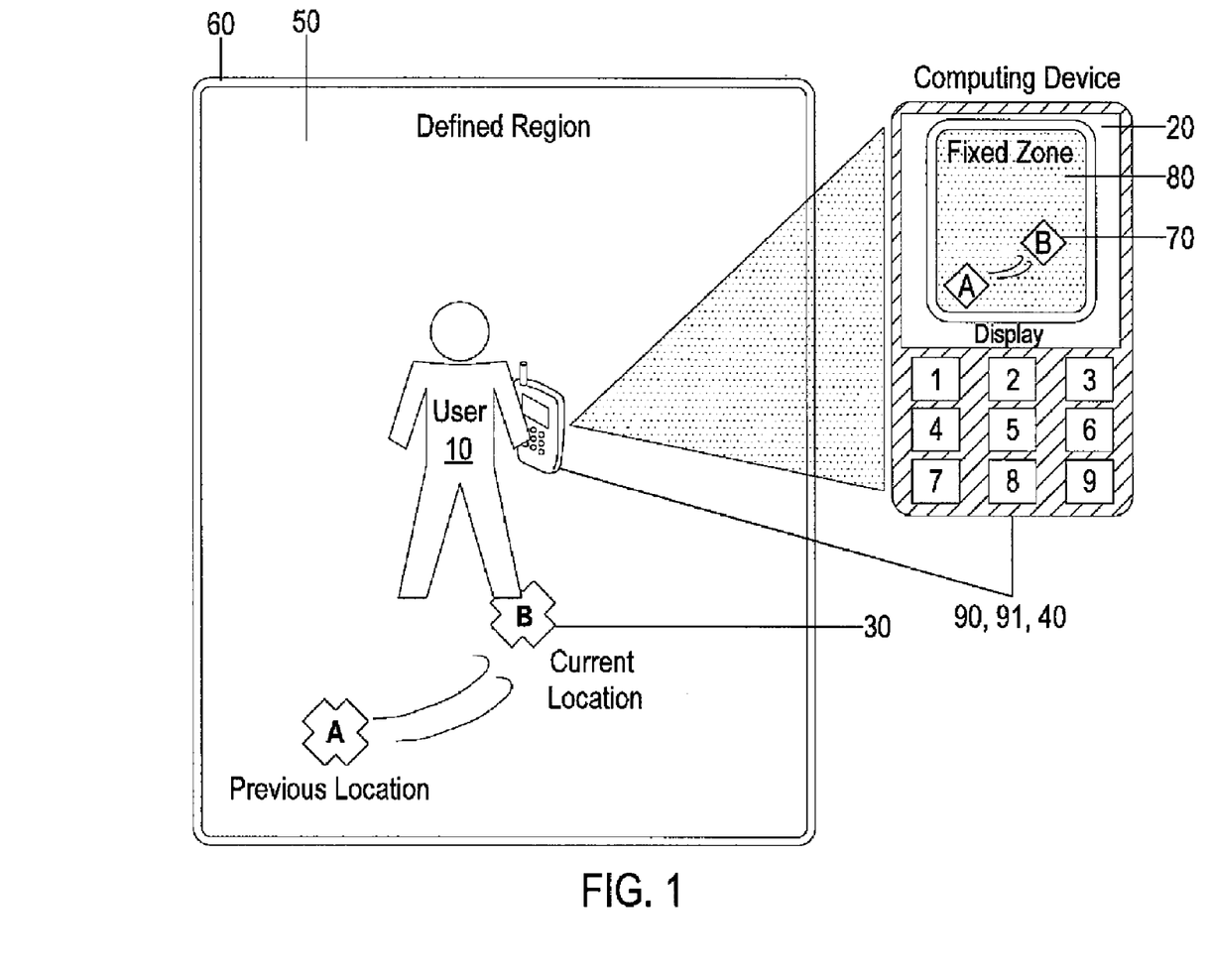
FIG. 1. The user is portrayed in the region. It can be seen that the user is carrying a locating device and a display. The whoosh marks indicate that the user has recently moved from point A to point B. The virtual position of the user is portrayed on the display. The whoosh marks indicate that the user's virtual position has recently moved from point A' to point B' on the display, which correlate to points A and B on the region, respectively.

The disclosure provides a method of representing a position of a user 10 on a display 20 visible to the user, comprising determining the user's geographic position 30 with a locating device 40, wherein the geographic position is within a region 50 having constant geographic boundaries 60; calculating a virtual position 70 as a function of the user's geographic position; and plotting the virtual position on the display 20, wherein the region corresponds to a fixed zone 80 of the display 20.

The display 20 can be of any type or size. Small portable displays may be used, based on any appropriate technology. The display 20 may be two-dimensional or three-dimensional, based for example on holography or stereoscopy. The display 20 can be larger and non-portable, so long as it is positioned such that it is visible to the user 10. Even huge displays, such as projection-based video, can thus be used in some embodiments of the method.

The user 10 may be an individual or any of a group of co-mobile individuals. The individual may be a pedestrian or may be mounted on a vehicle (or an animal). The vehicle may be of any kind, including a motor vehicle (such as automobiles and armored fighting vehicles), a manually-powered vehicle (such as a bicycle, skates, a skateboard, or a pogo stick), a wind-driven vehicle (such as a sailboat or a kite board), a water-driven vehicle (such as a surfboard), or an unpowered vehicle (such as a balloon). The possible vehicles include aircraft, ground vehicles, surface vessels, and submersibles, among others. Large vehicles, such as ocean-going ships, will likely carry a group of co-mobile individuals (the crew) any of whom may be a user at a given time.

The user's geographic position 30 can be determined by longitude and latitude, or by any other absolute or relative coordinate system. This will largely depend on the type of locating device employed.

The locating device can be any locating device known by those skilled in the art, or a combination of more than one. These include a GPS receiver, a LORAN receiver, a CHAYKA receiver, a Beidu receiver, a GLONASS receiver, other radio-based positional systems, a dead-reckoning system, a network of one or more sensors, and an inertial positioning system. Local, closed-circuit positioning systems have the advantage of high accuracy and in some instances can be used indoors and underground; they are also potentially better able to resist disruption due to space weather events, such as solar flares and magnetic storms. Satellite based systems have the advantage of being available globally. OPS has the advantage of widespread use in nearly every type of portable computing platform, allowing a wide variety of portable computing platforms to be used in the method. Regional ground-based systems such as LORAN have the advantage of using a stronger signal than satellite-based systems, allowing the signal to be received more easily and making the signal more resistant to jamming. Inertial devices have the advantage of requiring no signal and being completely independent of any greater system; thus they are immune to space weather, work in any environment, and cannot be jammed. Dead reckoning systems have similar advantages to inertial devices, although some (but not all) dead reckoning systems have the advantage of using little power. Networks of sensors (such as motion detectors) have the advantages of being resistant to jamming, being unaffected by space weather, and being independent of outside signals. Such networks can rely on both active detection (for example, if the user is wearing a transmitter or if the network broadcasts a radar or sonar signal) and passive detection (for example, detecting sound or infrared emissions from the user). Combinations of positional systems are also possible. A combination has the advantage of redundancy should one or more of the positional systems fail, and has the potential to enjoy the advantages of more than one system. For example, the method could be used with a GPS and an inertial locator, in which the GPS is used when satellite reception is strong and the inertial locator is used when needed indoors, under tree cover, underground, during periods of adverse space weather, etc.

The region 50 can be any real area with unchanging and set boundaries 60. It is beneficial if the locating device 40 (or combination of locating devices) functions in every part of the region 50. The region 50 can be indoors, outdoors, or can contain indoor and outdoor sections. The region 50 can be, for example, a sports field. The region 50 can be of virtually any shape. In some embodiments of the method, the region 50 is a polygon. In some of these embodiments, the region 50 is a rectangle. In some embodiments in which the region 50 is a rectangle, the region 50 is a square. In some other embodiments in which the region 50 is a rectangle, the region 50 is a standard soccer field, a non-standard soccer field, an international basketball court, an NBA basketball court, a football field, a baseball field, a racquetball court, a squash court, a tennis court, a handball court, any other standard sports field or court, and an area of the same dimensions as the foregoing. The use of standardized sport fields has the advantage of allowing the user to easily identify an area of exactly predetermined dimensions; it has the further advantage of enabling the method to be used for applications specific to a given sport. In some embodiments of the method, the region 50 is a closed curve, such as a circle, an oval, an ellipse, or any other closed curve. Moreover, the shape, size, and placement of the region 50 can vary greatly according to the resources available to the user and the needs of the particular application. In embodiments of the method the geographic bounds 60 of the region 50 are constant once defined, unless later altered or reset by the user.

The virtual position 70 of the user can be calculated by any means so long as the virtual position 70 is a function of t or representative of, the geographical position 30. In some embodiments of the method the user's two-dimensional virtual 70 and geographic 30 positions may be represented as two variables which together constitute a coordinate. In this context, one position is a "function of" another if any given geographic coordinate within the region 50 corresponds to exactly one virtual coordinate within the fixed zone 80 of the display 20. The function can be a linear function. The same function may be used to calculate both virtual position coordinate variables from both geographic positions' coordinate variables. In such an embodiment of the method, the fixed zone 80 of the display 20 will be congruent to the region 50.

In some embodiments the function may not be linear, and in some such embodiments the fixed zone 80 of the display 20 will not be congruent to the region 50. Examples of such non-linear functions are exponential functions, logarithmic functions, trigonometric functions, inverse functions, polynomial functions, and periodic functions. Any other type of function can be applied.

In some embodiments of the method the fixed zone 80 of the display 20 consists of the entire display 20. In such embodiments the shape of the display 20 corresponds to the shape of the region 50, although the two shapes will not always be congruent. In some embodiments of the method, in which the fixed zone 80 of the display 20 is congruent to the region 50, the user's virtual position 70 can be a simple linear function of the user's geographic position 30 (although it may be other functions as well). In some embodiments of the method in which the fixed zone 80 is not congruent to the region 50, the user's virtual position 70 may be a linear or non-linear function of the user's geographic position 30. In embodiments of the method in which the fixed zone 80 of the display 20 consists of the entire display 20, the shape of the display 20 will be a function of the shape of the region 50.

In some embodiments of the method, the virtual position 70 comprises a two-dimensional position. In such embodiments the user's elevation is not used to calculate the user's virtual position, or the user's elevation is translated into some aspect of the user's two-dimensional virtual position. In some embodiments of the method, the virtual position 70 comprises a three-dimensional position, wherein a third dimension is represented by the appearance of a symbol representing the virtual position. In such embodiments the symbol can portray a third-dimensional aspect (such as elevation) by any means known in the art, for example color, false relief, perspective, or shading. Of course, a combination of such visual tools can be used in concert. In some embodiments of the method, the display 20 is a three-dimensional display. In some such embodiments the virtual position 70 comprises a three-dimensional position, wherein the third dimension is represented without changing the appearance of a symbol representing the user's virtual position.

Figure 3:
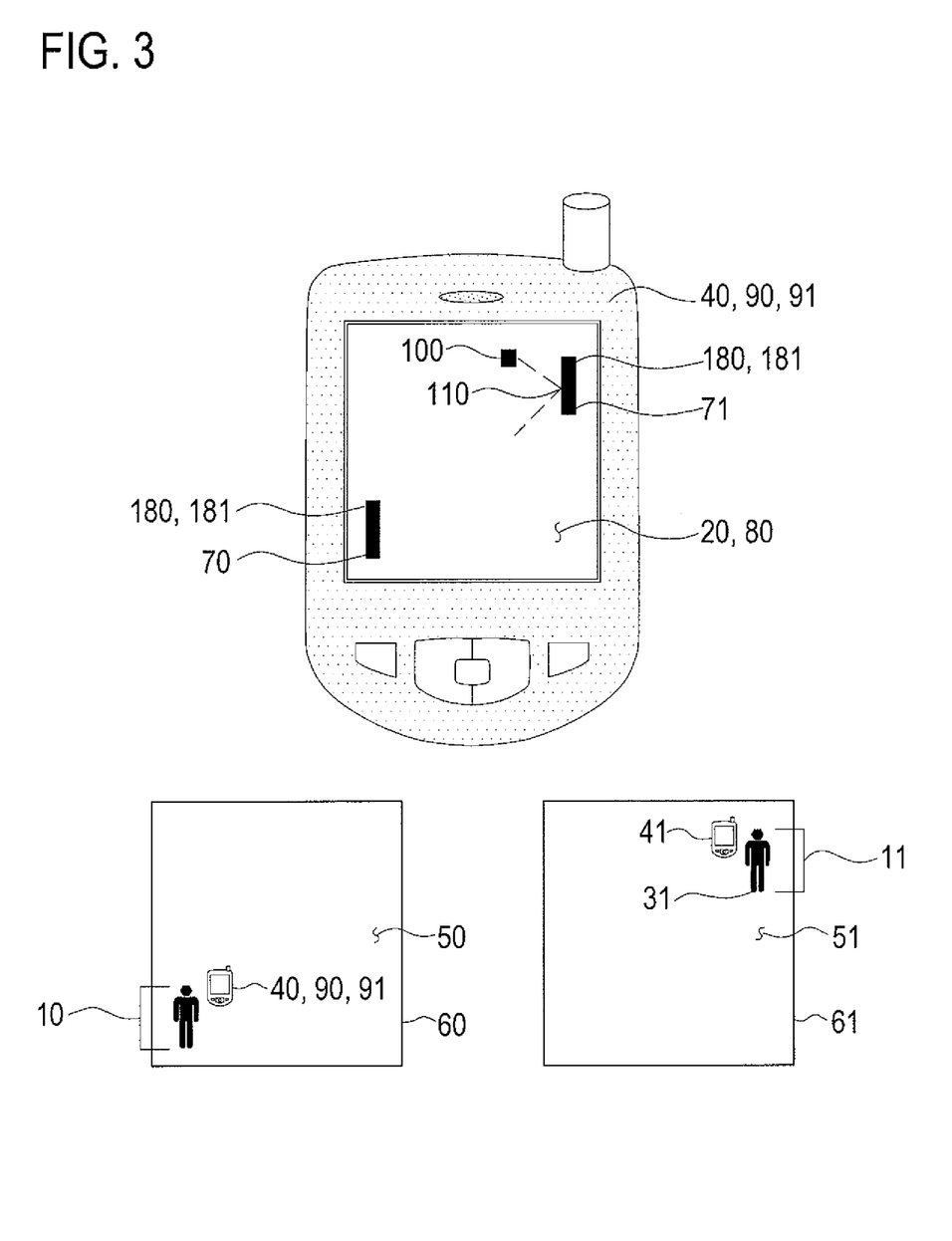
FIG. 3. This embodiment of the method and system is a version of the game "pong." The user is portrayed in the region, carrying an embodiment of the system that is a cellular telephone. A second user is portrayed in a second region. The display is enlarged to show that the first user's virtual position is represented as a game piece (the paddle on the right). A virtual destination position is shown as a square ball, and a collision event is occurring between the destination position and the first user's virtual position. On the opposite side of the display, the virtual position of a second user is shown, also represented as a paddle.

In some embodiments of the method, the display 20 is a component of a portable computing device 90. The portable computing device can be any portable computing device known in the art. In some embodiments of the method, the portable computing device further comprises the locating device. The portable computing device can be, for example, a cellular telephone 91, a PDA, a smart-phone, a handheld computing device, a laptop personal computer, or a portable navigation system. Cellular telephones have the advantage of small size, nearly universal ownership in some places, the ability to communicate with other users and systems, and software for cellular telephones is easily accessible to the user. A PDA has the advantage of small size, increased computing power and generally good communications capabilities. A laptop has the advantage of greater computing power still, greater data storage, and the ability to run multiple complex applications simultaneously.

Some embodiments of the method involve only a single user 10. Other embodiments of the method involve more than one user. Some embodiments of the method further comprise determining a second geographic position 31 of a second user 11 with a second locating device 41, wherein the second geographic position 31 is within a second region 51 having constant geographic boundaries 61; calculating a second virtual position 71 as a function of the second geographic position 31; and plotting the second virtual position 71 on the display 20. In such embodiments, the second locating device 41 and second region 51 can take any embodiment as disclosed for the first locating device 40 and the first region 50. The second virtual position 71 can be calculated from the second geographic position 31 by any of the means disclosed by which the first virtual position 70 can be calculated from the first geographic position 30.

In some embodiments of the method involving a second user 11, the second region 51 comprises the first region 50. In some such embodiments the first region 50 and the second region 51 are the same region. In these embodiments of the method, the first user 10 and the second user 11 are both present on the same region. In other embodiments of the method, one of the regions covers a larger area than the other region, and wholly encompasses the other region. In these embodiments both users would be present in the same region, although one of the users would only move about a portion of the larger region. In some embodiments of the method, the first and second regions 50, 51 partially overlap. In some embodiments of the method, the first region 50 and the second region 51 do not overlap. If the regions do not overlap, then the first user 10 and the second user 11 will be in separate locations, although the first virtual position 70 and the second virtual position 71 will be on the same fixed zone 80 of the display 20. In some embodiments of the method, regardless of the relative sizes and positions of the first 50 and second region 51, the first 50 and second region 51 both have boundaries 60, 61 that correspond to the fixed zones of both users' displays.

In some embodiments of the method, the user interacts with virtual "destination points" 100 on the display 20. Some embodiments comprise plotting a virtual destination position 100 on the display 20 within the zone 80; and registering a collision event 110 if the user's virtual position 70 is at least proximate to the virtual destination position 100. The virtual destination point 100 can represent any number of things in the application. It can represent a reward, in which case the "collision event" 110 may represent an increase in the score of a game. It can represent a trap to be avoided, in which case the collision event 110 may represent the end of a game. It can represent a waypoint, in which case the collision event 110 may trigger the appearance of another waypoint. It can represent a destination, in which case the collision event 110 may represent the successful end of a guided trip. The collision event 110 may be used for numerous different purposes depending on the application.

For example, in some embodiments of the method, the virtual destination position 100 changes after a temporal interval. In some such embodiments, the user 10 has only a certain amount of time to achieve a collision event 110 before the virtual destination point 100 shifts. Such embodiments could include a game in which the user 10 must promptly move to certain locations to accrue points. Such embodiments could also include a program to encourage timeliness in a delivery route or a patrol, in which the user 10 must promptly report to certain points or stations.

As another example, in some embodiments of the method the virtual destination position 100 changes to a new virtual destination position 101 after the collision event 110. As a result, the destination changes once the user reaches the destination. One potential application of such an embodiment is a treasure hunt game, in which the virtual destination position 100 represents a point at which a clue is dispensed; when the user reaches the destination, a clue is dispensed, and the next destination appears. Another potential application is a sport training application in which the user-athlete is to run a pattern, each virtual destination position 100 being a point in the pattern. Yet another potential application is a version of the game "snake," in which the virtual destination position 100 represents an "apple" to be eaten by the snake.

In some embodiments of the method, the new virtual destination position 101 is determined by a predefined rule set. The rule set may fit any pattern, or even be based on the results of a random number generator. The rule set may depend on variables that include the user's virtual position 70, another user's virtual position 71, the user's virtual position history, the history of destination positions, the history of collision events, or any other appropriate factors for the given application.

Figure 6:
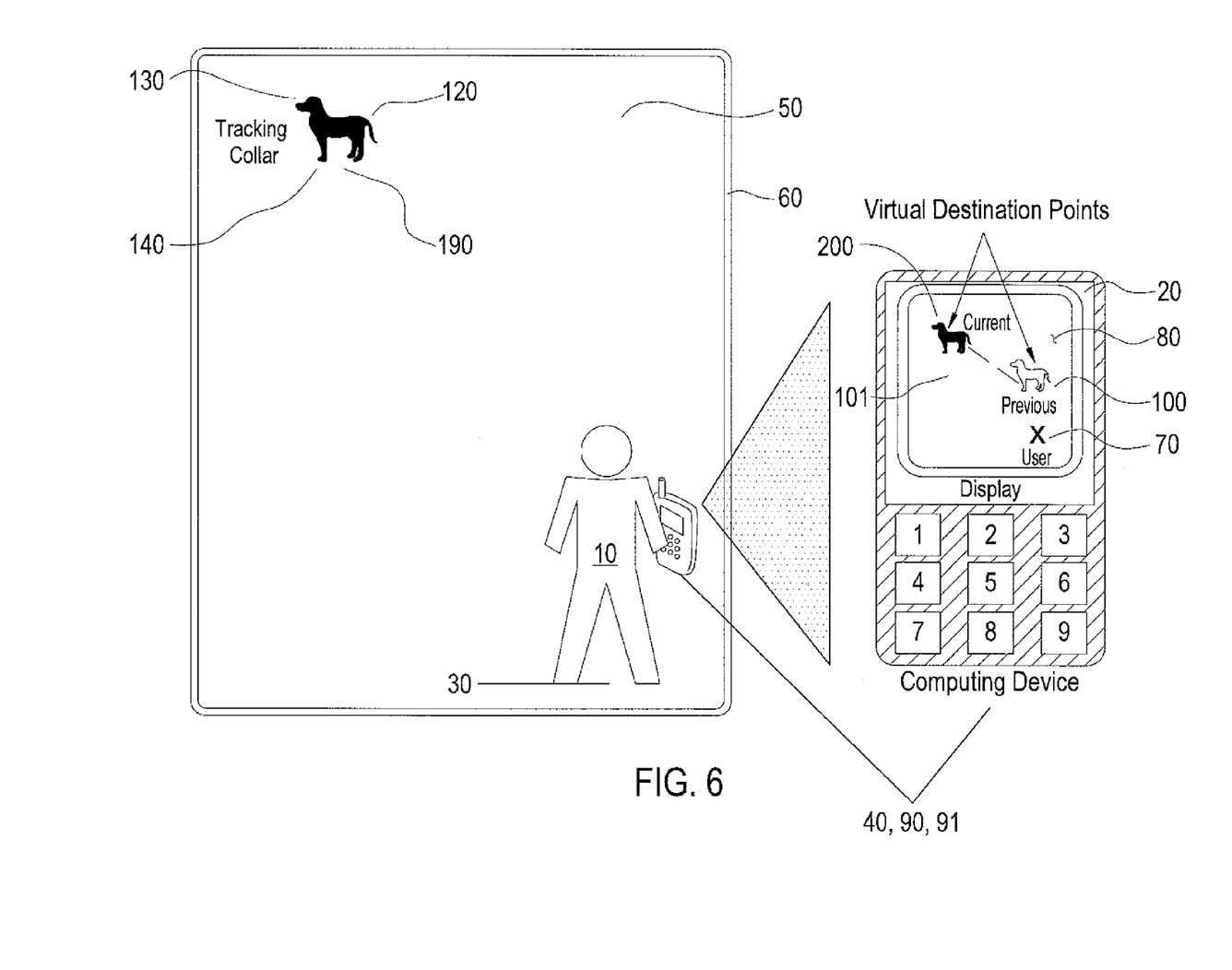
FIG. 6. An embodiment of the method in which a geographic position of an object in the field (a dog wearing a radio-tracking collar) is represented as a virtual object position in the fixed zone of the display, wherein the object's geographic position is determined using an object locating device, and wherein the object's virtual position is a virtual destination point. The user is also in the field and is also represented on the display.

In some embodiments of the method, the new virtual destination position 101 corresponds to the trajectory of an object 120. The object 120 may be a real object, such as a ball or puck, or it may be a purely virtual object. If the object 120 is a real object, the real object may comprise an object locating device 130; in such embodiments the virtual destination position 100 may be determined based on position information from the object locating device 130. If the object 120 is a virtual object, the object's trajectory may be calculated based on any appropriate factor. Such factors may include a user's velocity, a user's speed, the object's velocity, the object's speed, or characteristics of the environment.

The virtual destination position 100 will correspond to a geographic destination position 140. It is to be understood that the proximity of the user's virtual position 70 to the virtual destination position 100 will correlate to the proximity of the user's geographic position 30 to the geographic destination position 140. The user's geographic position 30 and the geographic destination 140 position will both be within the region 50.

In some embodiments of the method, the region 50 is a rectangle, and the zone 80 is a rectangle congruent to the region 50. In such embodiments the user's virtual position 70 may be a linear function of the user's geographic position 30 in which the slope is 1 or about 1.

Figure 4:
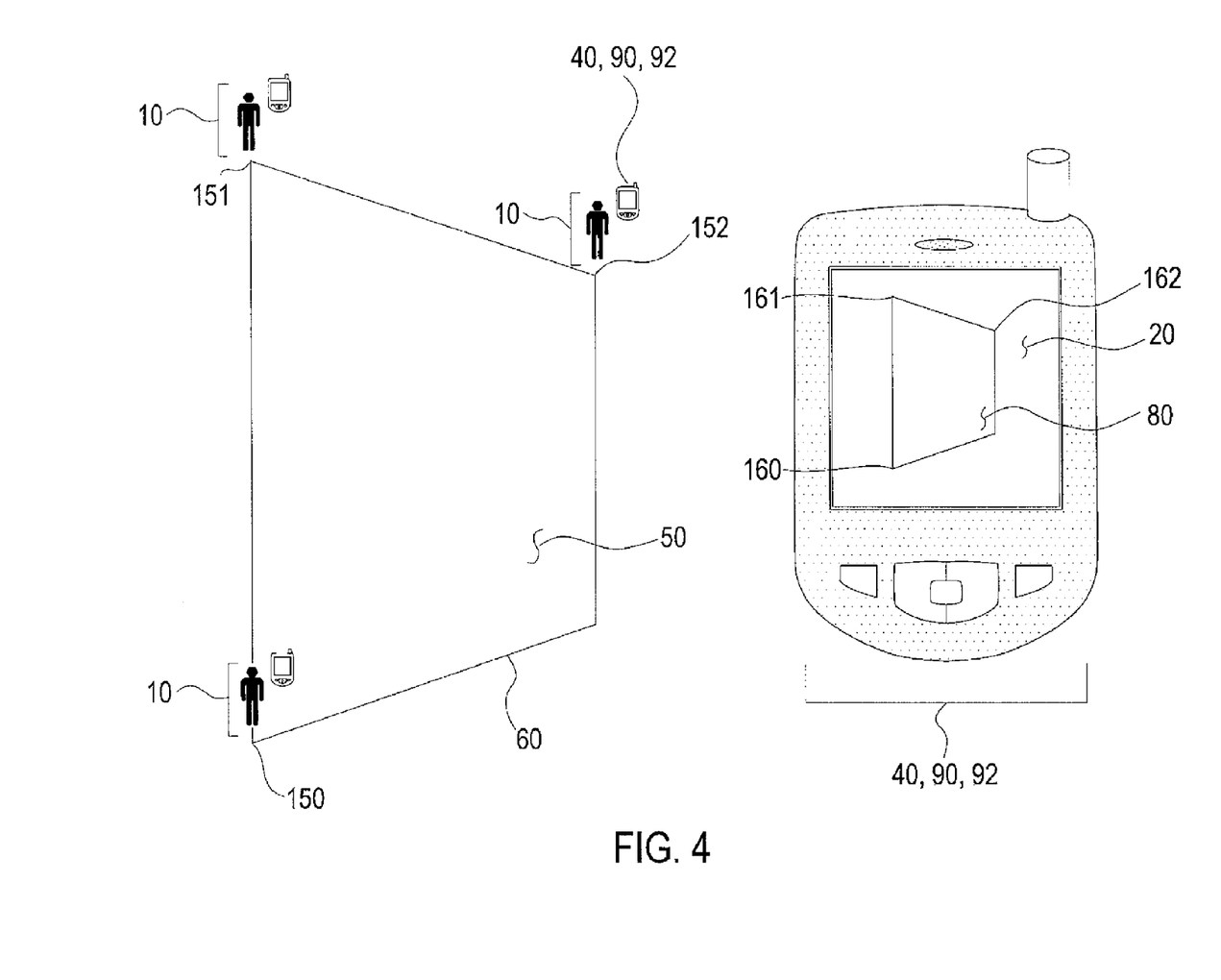
FIG. 4. An embodiment of the method of defining the region and the zone is portrayed, showing the user moving from location to location to define the boundaries of the region and the boundaries of the zone.

Some embodiments of the method comprise defining the constant geographic boundaries 60. In some embodiments of the method, at least one of the size, orientation, and location of the region 50 are predetermined. In those embodiments in which all three are predetermined, there is no need to further define the region 50. In cases in which some of the region characteristics have not been predetermined, the user may define the region 50.

In some embodiments of the method, the definition of the constant geographic boundaries 60 of the region 50 comprises: placing the user 10 at a first geographic orientation point 150 within the region 50; determining the geographic position 30 of the user 10 at the first geographic orientation point 150; placing the user 10 at a second geographic orientation point 151 within the region 50; determining the geographic position 30 of the user 10 at the second geographic orientation point 151; calculating a first virtual orientation point 160 as a function of the first geographic orientation point 150; and calculating a second virtual orientation point 161 as a function of the second geographic orientation point 151. Two-dimensional objects (areas) can be defined using as few as two reference points. In these embodiments, the user 10 provides the reference points by moving to the reference points; the user's position is recorded and the boundaries 60 of the region 50 are thus determined. If the dimensions and orientation of the region are predetermined, then the region may be defined simply by defining a single virtual orientation point (such as the center of a soccer field of precisely known orientation and dimensions).

Depending on the shape of the region 50, further embodiments of the method may be practiced. Some embodiments of the method, in which the region 50 is polygonal, comprise: placing the user 10 at a set of at least one additional geographic orientation point 152; determining the geographic position 30 of the user 10 at each of the additional geographic orientation points 152; calculating an additional virtual orientation point 162 as a function of each of the geographic positions of each additional geographic orientation points 152; defining the region 50 as a polygon having vertices corresponding to each of the first, second, and additional geographic orientation points; and defining the fixed zone 80 as a polygon having vertices corresponding to each of the first, second, and additional virtual orientation points. By this embodiment of the method the user 10 can define the region 50 simply by going to each corner of the polygonal region. This embodiment of the method allows the region 50 to be defined as any polygon.

Further embodiments of the method, in which the region 50 is an equilateral polygon, comprise: defining the region 50 as the equilateral polygon, wherein the first geographic orientation point 150 corresponds to a polygonal center, and wherein the second geographic orientation point 151 corresponds to a polygonal vertex; and defining the fixed zone 80 as the equilateral polygon, wherein the first virtual orientation point 160 corresponds to a zonal polygonal center, and wherein the second virtual orientation point 161 corresponds to a zonal polygonal vertex. By this method any equilateral polygon can be quickly and easily defined.

Further embodiments of the method, in which the region 50 is a predefined polygon, and wherein the proportions of the sides are pre-determined, comprise: defining the region 50 as the predefined polygon, wherein the first geographic orientation point 150 corresponds to a first regional polygonal vertex, wherein the second geographic orientation point 151 corresponds to a second regional polygonal vertex, and wherein an additional geographic orientation point 152 corresponds to a third regional polygonal vertex; and defining the fixed zone 80 as the predefined polygon, wherein the first virtual orientation point 160 corresponds to a first zonal polygonal vertex, wherein the second virtual orientation point 161 corresponds to a second zonal polygonal vertex, and wherein the additional virtual orientation point 162 corresponds to a third zonal polygonal vertex. By this embodiment of the method, the region 50 is pre-defined as a polygon of pre-determined proportions and the user further defines the size and orientation of the polygon by defining three vertexes. The defined vertexes may be adjacent or non-adjacent. Additional vertexes may be defined as well. If only two polygonal vertices are used, the user's position 30 can be used to further define the polygon. For example, if two adjacent vertices have been specified, the user's position 30 can be defined as being either interior or exterior to the polygon.

Further embodiments of the method, in which the region is circular, comprise: defining the region 50 as a circle wherein the center of the region is the first geographic orientation point 150 and the circumference of the region comprises the second geographic orientation point 151; and defining the fixed zone 80 as a circle wherein the center of the zone is the first virtual orientation point 160 and the circumference of the zone comprises the second virtual orientation point 161. By this embodiment of the method, the region 50 is pre-defined as a circle, and the user further defines the region's size by positioning the user at the center of the circle and on the circumference of the circle.

Some embodiments of the method in which the region 50 is rectangular comprise: placing the user at an additional geographic orientation point 152; determining the geographic position of the user 10 at the additional geographic orientation point 152; calculating an additional virtual orientation point 162 as a function of the geographic position of the additional geographic orientation point 152; defining the region 50 as a rectangle wherein a first regional vertex is the first geographical orientation point 150, wherein a second regional vertex is the second geographical orientation point 151, and wherein a third regional vertex is the additional geographical orientation point 152; and defining the fixed zone 80 as a rectangle wherein a first zonal vertex is the first virtual orientation point 160, wherein a second zonal vertex is the second virtual orientation point 161, and wherein a third zonal vertex is the additional virtual orientation point 162. A rectangular region has the advantage of both ease of definition and flexibility. By defining three vertices of the rectangle, a rectangle of any size and proportions can be defined. For example, a soccer field can be defined by positioning the user at three corners of the field. The same flexible method could be used to define the region as a tennis court (a rectangle of different dimensions and proportions from a soccer field), as a city block, as the National Mall in Washington, D.C., or as the state of Wyoming. Any rectangle can be defined by this method.

Figure 5:
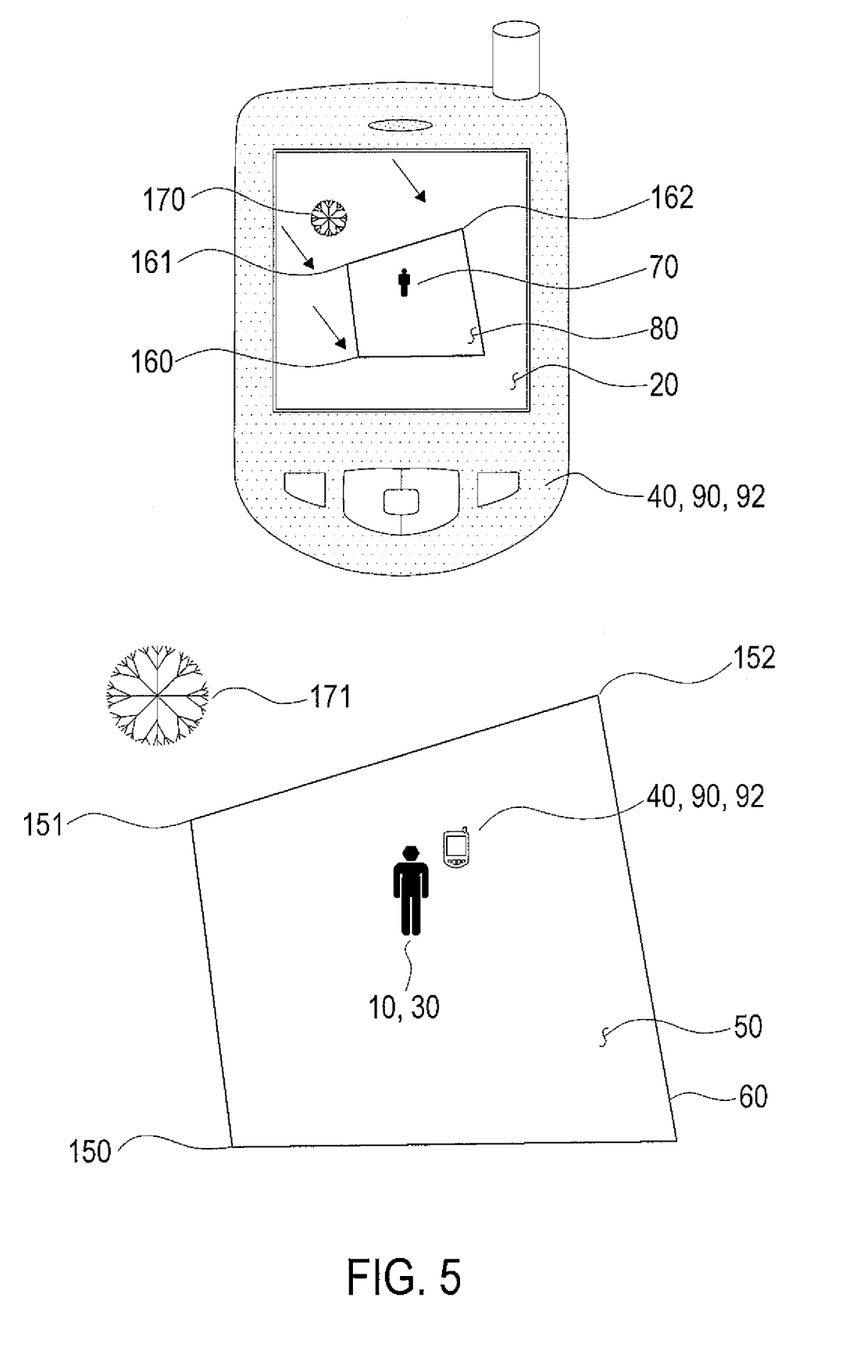
FIG. 5. An embodiment of the method of defining the region and the zone is portrayed, showing the definition of the zone on the display, using a virtual reference point to orient the user. A stylus is shown, used to designate the edges of the zone.

The region can also be defined using only the display 20, so long as the display 20 bears some point of reference. In some embodiments of the method, the definition of the constant geographic boundaries of the region further comprises: representing a virtual reference point 170 on the display 20, wherein the virtual reference point 170 corresponds to a geographic reference point 171 known to the user; specifying on the display 20 a first virtual orientation point 160; calculating a first geographic orientation point 150 as function of the first virtual orientation point 160; specifying on the display 20 a second virtual orientation point 161; and calculating a second geographic orientation point 151 as function of the second virtual orientation point 161. In such embodiments, the user has at least a general idea of the location of the geographic reference point, and uses its representation on the display 20 (the virtual reference point 170) to decide where to place the boundaries of the region 50. The geographical orientation points 150, 151 can be calculated based on the distance and orientation of the user relative to the reference point 170.

In some of these embodiments, the virtual reference point 170 is at least one of a landmark, a street intersection, a point on an athletic field, a topographical feature, a virtual location of another user, a corner in a political boundary, and a combination thereof (for example, the intersection of a political boundary and a topographical feature). In some embodiments of the method, a plurality of virtual reference points is represented. Some embodiments comprise representing a map of the area around the user or a satellite photograph of the area around the user. The user then designates virtual orientation points 160 on the map or satellite photograph. In some embodiments of the method, the virtual reference points 170 may simply be points at a certain distance from the user's position, such as would be found on a map scale. These points could be in various configurations, such as a rule or a set of concentric circles. Prior to specifying the virtual reference points 170, the user may in some embodiments scroll or zoom to achieve a region 50 of suitable size (although no such scrolling or zooming will be required to track the user once the region has been defined).

The region 50 thus defined can be of any shape. For example, some embodiments, in which the region 50 is polygonal, further comprise: specifying on the display 20 a set of at least one additional virtual orientation point 162; calculating an additional geographic orientation point 152 as a function of each of the additional virtual orientation points 162; defining the region 50 as a polygon having vertices corresponding to each of the first, second, and additional geographic orientation points; and defining the fixed zone 80 as a polygon having vertices corresponding to each of the first, second, and additional virtual orientation points.

As another example, some embodiments of the method, in which the region 50 is an equilateral polygon, further comprise: defining the region 50 as the equilateral polygon, wherein the first geographic orientation point 150 corresponds to a regional polygonal center and wherein the second geographic orientation point 151 corresponds to a regional polygonal vertex, and defining the fixed zone 80 as the equilateral polygon, wherein the first virtual orientation point 160 corresponds to a zonal polygonal center and wherein the second virtual orientation point 161 corresponds to a zonal polygonal vertex.

Such embodiments of the method are not limited to polygonal regions. The region 50 may be a curve, such as a circle. Some embodiments of the method, wherein the region 50 is circular, further comprise: defining the region 50 as a circle wherein the center of the region is the first geographic orientation point 150 and the circumference of the region comprises the second geographic orientation point 151; and defining the fixed zone 80 as a circle wherein the center of the zone is the first virtual orientation point 170 and the circumference of the zone comprises the second virtual orientation point 171. In some embodiments, the user may designate the user's position as either the center or as a point on the circumference. These embodiments provide the advantage of the quick and easy definition of a circular region.

Some embodiments of the method, in which the region 50 is rectangular, further comprise: specifying on the display an additional virtual orientation point 162; calculating an additional geographic orientation point 152 from the additional virtual orientation point 162; defining the region 50 as a rectangle wherein a first regional vertex is the first geographical orientation point 150, wherein a second regional vertex is the second geographical orientation point 151, and wherein a third regional vertex is the additional geographic orientation point 152; and defining the fixed zone 80 as a rectangle wherein a first zonal vertex is the first virtual orientation point 160, wherein a second zonal vertex is the second virtual orientation point 161, and wherein a third zonal vertex is the additional virtual orientation point 162. A rectangular region has the advantage of both ease of definition and flexibility. By defining vertices of the rectangle, a rectangle of any size and proportions can be defined. The method could be used to define the region 50 as a tennis court, as a city block, as the National Mall, or as the state of Wyoming. Any rectangle can be defined by this method.

In some embodiments of the method, the user's virtual position 70 is plotted as a game piece 180. The game piece 180 is a representation appropriate for a game or application. The game piece 180 can take a wide variety of forms, as understood by those skilled in the art. Games pieces appropriate to various types of games include a paddle 181, a gun platform, a human figure, a stylized animal, a vehicle, a chess figure, a chip, a mythical beast, and any shape or portrayal useful and/or aesthetically pleasing in the game. The portrayal of the game piece 180 may be stylized, whimsical, or highly realistic. The game piece 180 can be a portrayal of any piece used in a traditional non-computerized game, such as an image of a pawn from Indian chess, or the pictographic symbol for the King (ōshō) in shogi. The portrayal can be abstract, such as a change in the coloration pattern or tinting of the background of the display 20. The forms that a game piece 180 may take are practically without limit.

In some embodiments of the method, the user's virtual position 70 is plotted as an art stylus. In this context an "art stylus" refers to any tool for marking, writing, or other creation of visual art. The stylus can be portrayed as highly schematic, or it may resemble a paint brush, a pencil, a paint can, a lasso, a cursor, or any other known tool of the visual arts. Such a stylus is particularly appropriate when used in conjunction with drawing, painting, and designing applications, but can be used for other applications as well.

Some embodiments of the method further comprise recording a virtual path of the user's virtual position 70 over time. The virtual path can be a line comprising at least one point that was the user's virtual position 70 during a period of time. The virtual path may comprise all such points, or only a subset of points. In some embodiments, the user signals when the user's geographic position 30 corresponds to a virtual position 70 the user desires to be incorporated into the path. In some embodiments, the user's virtual position 70 is stored as a point in the path at a given fixed time internal, for example every 30 seconds. In some embodiments, particular events (such as collision events 110) trigger the recording of the user's virtual position 70 as a point in the path. Other variations on defining the user's path are possible as is known by those skilled in the art.

Some embodiments of the method further comprise calculating a statistic based on the user's virtual path and communicating the statistic to the user. The statistics calculated can have a wide variety of applications. For example, the statistic may be at least one of: average speed, distance traveled, net velocity, instant speed, instant velocity, maximum speed, average acceleration, maximum acceleration, duration of maximum speed, duration of maximum velocity, and duration of maximum acceleration. Statistics thus calculated can be extremely useful in a wide variety of applications. The statistic may be used to measure athletic ability, athletic weaknesses, athletic progress, progress in a program of physical rehabilitation, conformity of the user's movement to a predetermined plan, conformity in the movements of a group of users in a predetermined team plan, energy consumption by the user, deviation from a best path, or other useful statistics known by those skilled in the art.

Some embodiments of the method further comprise: determining the geographic position of an object 120 with an object locating device 130, wherein the object geographic position 190 is within the region 50; calculating an object virtual position 200 as a function of the object geographic position 190; and plotting the object virtual position 200 on the display 20. The object 120 may be controlled or uncontrolled. Examples of controlled objects include a vehicle operated by a non-user, an elevator, a remotely guided drone, or a pre-programmed drone. Examples of uncontrolled objects include a ball, an animal, a projectile, a float, an un-programmed drone that is not controlled remotely, a rogue vehicle, a satellite, or a balloon. The object 120 can serve a variety of purposes in various applications.

Some embodiments of the method comprise: locating the user at a first corner of a rectangular region 50 having constant geographic boundaries; determining with a GPS receiver the geographic location of the user 30 as a first geographic boundary point; relocating the user to a second corner of the region 50; determining the geographic location of the user 30 with the GPS as a second geographic boundary point; relocating the user to a third corner of the region 50; determining the geographic location of the user 30 with the GPS as a third geographic boundary point; calculating a first virtual boundary point as a function of the first geographic boundary point; calculating a second virtual boundary point as a function of the second geographic boundary point; calculating a third virtual boundary point as a function of the third geographic boundary point; defining the edges of the display 20 as a rectangle, wherein a first display corner corresponds to the first virtual boundary point, a second display corner corresponds to the second boundary point, and a third display corner corresponds to the third boundary point, generating a linear x-axial regression between longitude coordinate and a virtual X coordinate, wherein the virtual X coordinate is a function of the longitude coordinate; generating a linear y-axial regression between latitude coordinate and a virtual Y coordinate, wherein the virtual Y coordinate is a function of the latitude coordinate; determining the user's latitude coordinate and the user's longitude coordinate with a GPS, wherein the user is within the region; calculating the user's virtual X coordinate according to the x-axial regression; calculating the user's virtual Y coordinate according to the y-axial regression; and plotting the user's virtual position on the display 20 at the user's virtual X coordinate and the user's virtual Y coordinate. In such embodiments the region 50 need not be congruent with the display 20, as the x-axial regression and y-axial regression will be calculated to allow a rectangular region 50 of virtually any proportions to be used. Defining three corners of the region has the advantage of allowing the user to quickly and easily define the boundaries of a rectangular region 50. Using a latitude coordinate and a longitude coordinate has the advantage of global application and requiring no transformation of GPS data. Analogous methods could be used using some other positioning system, using coordinate systems based on latitude and longitude or based on another coordinate system.

C. Systems

The disclosure provides systems and electronic data storage devices for performing any of the disclosed methods. The systems and devices may take many forms, and the embodiments below are descriptive of some such forms.

Figure 2:
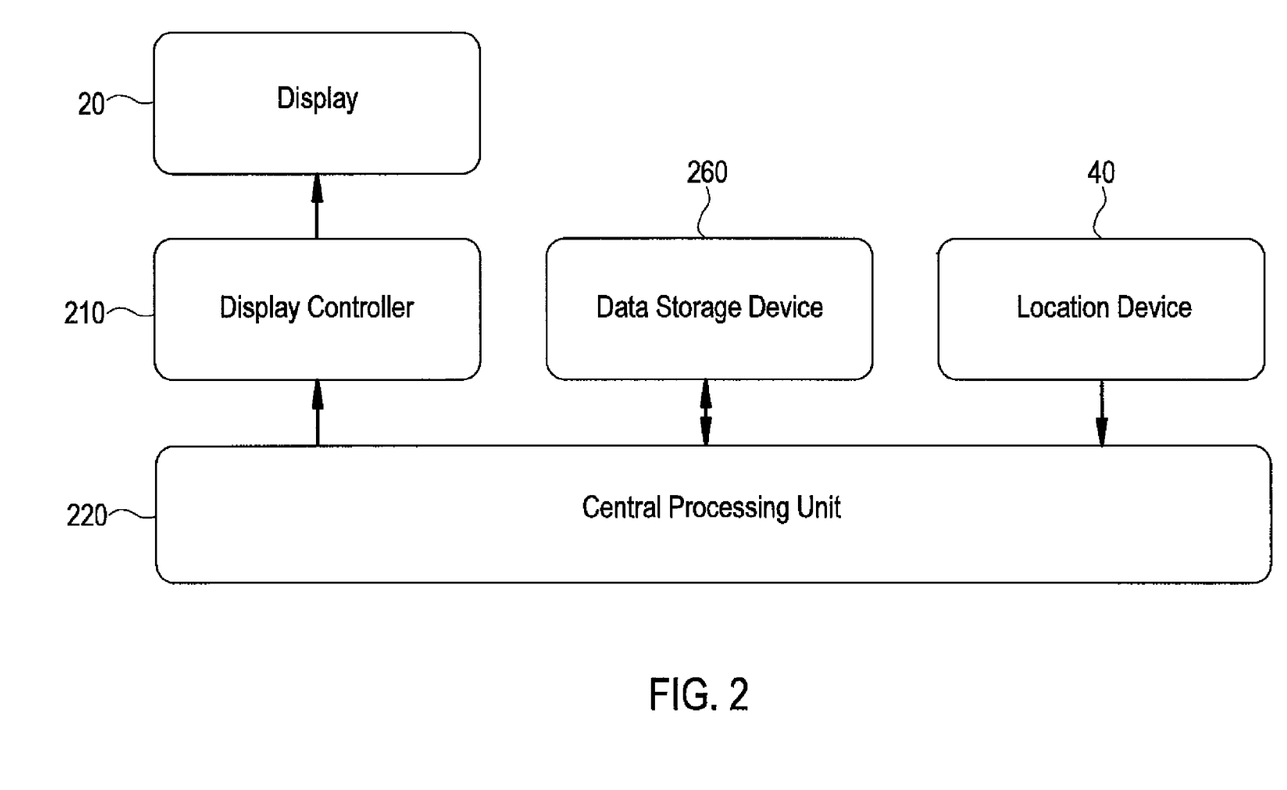
FIG. 2. A schematic diagram of an embodiment of the systems disclosed is presented.

Provided is a system for representing a position of a user 10 in a region 50 having constant geographical boundaries 60 on a bounded display 20. Some embodiments of the system comprise: a display 20 visible to the user; a display controller 210 capable of rendering a virtual position of the user 70 on the display 20; a locating device 40 for determining a geographic position of the user 30; a processor 220 in communication with the locating device 40 wherein the processor 220 is programmed to perform the steps of any method disclosed herein. For example, the processor 220 may be programmed to perform the steps of (1) determining the virtual position of the user 70 as a function of the geographic position communicated by the locating device; (2) causing the display controller 210 to render the virtual position 70 on the display 20; and (3) defining a virtual boundary of a fixed zone of the display 80 corresponding to the constant geographic boundaries 60 of the region 50.

The display 20 can be any type of display known to those in the art, as described elsewhere in this disclosure. The display 20 should be visible to the user 10 from any point in the region 50, or from essentially any point within the region 50. For example, a large screen display in a football stadium is visible to a user on the football field, except for those instances when another person on the field or some other type of object blocks the user's line-of-sight. This is an example of a display that is visible to the user from essentially any point within the region.

The locating device 40 may be carried on or near the user 10, or it may be remote from the user 10. The locating device 40 should be capable of determining the user's position 30 (alone or in combination with additional locating devices) anywhere within the region 50. The processor 220 may be in any form of communication with the locating device 40, so long as the processor 220 is able to receive adequate position data to calculate the user's virtual position 70. The processor 220 and the locating device 40 may be in the same housing, or these elements may be housed separately. The processor 220 may be remote from the user 10, wherein it receives and transmits data remotely to and from the user 10. In some embodiments, such as a cellular telephone 91, the display 20, processor 220, and locating device 40 are all within the same portable housing. The processor 220 may be in communication with additional locating devices 41 proximate to additional users 11 if the system is used for multi-user applications. In some embodiments the processor 220 is in communication with an object locating device 130.

Some embodiments of the system comprise: a means of determining the user's geographic position 30, wherein the geographic position 30 is within a region 50 having constant geographic boundaries 60; a means of calculating a virtual position 70 as a function of the user's geographic position 30; and a means of plotting the virtual position 70 on the display 20, wherein the region 50 corresponds to a fixed zone 80 of the display 20.

The disclosure also provides an electronic data storage device 260 comprising a stored program, wherein the stored program comprises: a module for defining a virtual boundary of a fixed zone 80 of a display 20 corresponding to a constant geographical boundary 60 of a region 50; and a module for calculating a virtual position of a user 70 as a function of the geographic position of the user 30. The electronic storage device 260 can be any such device known in the art, including a magnetic storage medium, an optical storage medium, a jump drive, a hard drive, a floppy disk, an optical disk (such as a CD ROM or DVD ROM), a holographic memory device, a microdrive, tape, MRAM, any form of flash memory, any form of ROM, or any other storage device known in the art. Non-volatile data storage devices have the advantage of retaining data when unpowered. Volatile data storage devices have the advantage of being easily rewritable.

The modules can function according to any of the methods disclosed. In addition, it is within the capabilities of those of ordinary skill in the art to author such modules based on the description provided.

D. Examples

In one example, the methods, systems and electronic storage devices of the instant disclosure constitute a version of the simple game, "pong." The fixed zone 80 of the display 20 is rectangular, and the region 50 is more or less linear (a narrow rectangle). The user 10 defines the end-points of the region 50, which correspond to the top and bottom edges of the zone 80. The user's position 30 in the region 50 corresponds to his paddle in the game of pong. The other paddle is controlled either by the software or by another user 11 in another region 50. The paddle is controlled by the user by walking, running, jumping or diving back and forth within the region 50. By moving the paddle the user causes her virtual position 70 (and thus the paddle) to collide with a small square "ball" on the screen. When the collision occurs, the ball's trajectory is altered accordingly. The display 20 and locating device 40 can be part of a portable computing device 90, such as a cellular telephone 91 or a PDA. If the portable computing device 90 is a cellular telephone 91, the user 10 can play against any other user 11 with the proper phone and software, so long as the other user 11 has cellular service. In this way the normally sedentary game of pong can be enjoyed in a more physically rigorous and healthy manner.

In another example, the methods, systems and electronic storage devices of the instant disclosure constitute an improved local navigation system for tourism. The region 50 in this case may be an unfamiliar city, or the downtown or other regions (large or small) of an unfamiliar city. In such a scenario the fixed boundaries 60 of the region 50 may be determined using preset coordinates. Alternatively, the user 10 may define the region by selecting the boundaries 60 of the region 50 on a map of the city that appears on the display 20. The user's position appears on the display 20 at all times, allowing the user to know her location relative to a fixed set of landmarks at all times, without the need to zoom in or out, and without the need to proceed in a given direction until a landmark appears on the display 20 (as is necessary using conventional navigation systems). In this example the user can also be warned if she is about to stray from the region 50, away from the area she has chosen to explore.

In a similar example, the methods, systems and electronic storage devices of the instant disclosure constitute a navigation system for police patrolmen. The region 50 in such a case may have the boundaries of the patrolman's police powers (such as the city limits or county line) or of the patrolman's administrative area (such as the precinct). As in the previous example, the patrolman would always be aware of her position in the region 50 without the need for landmarks and street signs. Additionally, the other "users" 11 could be every other patrol in the region 50. As a result, the patrolman never needs to communicate with other patrols to discern their whereabouts, and will be aware of significant events, such as an unusual gathering of patrolmen or a sudden deployment of additional patrolmen.

In another example, the methods, systems and electronic storage devices of the instant disclosure are used in an athletic training application. In one possible example, the display 20 is congruent to the region 50, which is a football field. The user 10 is a wide receiver. The display 20 shows the user's position on the football field, and additionally shows patterns that correspond to the team's playbook. The user 10 can see on the display 20 the best starting position for a given play, and can see where on the field 50 he needs to run to complete the pattern. The user 10 can monitor his adherence to the pattern as he runs, and he can study his virtual path after he has attempted to run the pattern. In another version of the athletic training application, the fixed zone 80 of the display 20 is congruent to the region 50, which is a tennis court. In addition to defining the boundaries of the tennis court, the user may define the length of his racket's reach, for example by standing on the sideline such that when his arm is fully extended the racket's sweet spot touches the net post. The application can then define the area within the court from which the user's racket can reach any point in-bounds. The user can then practice running around the court without leaving the area.

In another example, the methods, systems and electronic storage devices of the instant disclosure constitute a crop-pattern production assistant. The region 50 is of any shape, for example a circle or regular polygon. A pre-determined virtual crop pattern appears on the display 20, such that the virtual crop pattern is static relative to the fixed zone 80 of the display 20. The user's virtual position 70 in the region 50 is represented on the display 20, such that the user 10 is aware of her position relative to the pattern. Optionally, the user 10 can communicate to the processor 220 when the crop in her geographic location 30 has been pressed. In this way crop patterns can be produced quickly and easily, even though the maker of the crop pattern cannot see the totality of the pattern. In this example, the display 20 may be part of a PDA 92 or navigation device 93, which has the advantages of large displays and complex user interfaces.

E. Conclusions

The foregoing description illustrates and describes the methods, systems, electronic storage devices, and other teachings of the present disclosure. Additionally, the disclosure shows and describes only certain embodiments of the methods, systems, electronic storage devices, and other teachings disclosed, but, as mentioned above, it is to be understood that the teachings of the present disclosure are capable of use in various other combinations, modifications, and environments and is capable of changes or modifications within the scope of the teachings as expressed herein, commensurate with the skill and/or knowledge of a person having ordinary skill in the relevant art. The embodiments described hereinabove are further intended to explain certain best modes known of practicing the methods, systems, electronic storage devices, and other teachings of the present disclosure and to enable others skilled in the art to utilize the teachings of the present disclosure in such, or other, embodiments and with the various modifications required by the particular applications or uses. Accordingly, the methods, systems, electronic storage devices, and other teachings of the present disclosure are not intended to limit the exact embodiments and examples disclosed herein.

I claim:

1. A method of representing a position of a user on a display visible to the user, comprising:
   (a) determining the user's geographic position with a locating device, wherein the geographic position is within a region having constant geographic boundaries;
   (b) calculating a virtual position as a function of the user's geographic position;
   (c) plotting the virtual position on the display visible to the user, wherein the region corresponds to a fixed zone of the display, said zone having constant boundaries corresponding to the constant geographic boundaries of the geographical region;
   (d) determining a second geographic position of a second user with a second locating device, wherein the second geographic position is within a second region having constant geographic boundaries;
   (e) calculating a second virtual position as a function of the second geographic position; and
   (f) plotting the second virtual position on the display.

2. The method of claim 1, wherein the fixed zone consists of the entire display.

3. The method of claim 1, wherein the virtual position comprises a two-dimensional position.

4. The method of claim 1, wherein the virtual position comprises a three-dimensional position, and wherein a third dimension is represented by the appearance of a symbol representing the virtual position.

5. The method of claim 1, wherein the display is a component of a portable computing device.

6. The method of claim 5 wherein the portable computing device further comprises the locating device.

7. The method of claim 6, wherein the portable computing device is selected from the group consisting of: a cellular telephone, a PDA, a smart-phone, a handheld computing device, a laptop personal computer, and a portable navigation system.

8. The method of claim 1, wherein the second region comprises the first region.

9. The method of claim 1, further comprising:
   (a) plotting a virtual destination position on the display within the zone; and
   (b) registering a collision event if the user's virtual position is at least proximate to the virtual destination position.

10. The method of claim 9, wherein the virtual destination position changes after a temporal interval.

11. The method of claim 9, wherein the virtual destination position changes to a new virtual position after the collision event.

12. The method of claim 11, wherein the new virtual destination position is determined by a predefined rule set.

13. The method of claim 11, wherein the new virtual destination position corresponds to the trajectory of an object.

14. The method of claim 1, further comprising defining the constant geographic boundaries.

15. The method of claim 1, wherein the user's virtual position is plotted as a game piece.

16. The method of claim 1, wherein the user's virtual position is plotted as an art stylus.

17. The method of claim 1, further comprising recording a virtual path of the user's virtual position over time.

18. The method of claim 1, wherein the region is a rectangle, and wherein the zone is a rectangle congruent to the region.

19. The method of claim 1, further comprising:
   (a) determining an object geographic position of an object with an object locating device, wherein the object geographic position is within the region;
   (b) calculating an object virtual position as a function of the object geographic position; and
   (c) plotting the object virtual position on the display.

20. A method of representing a position of a user on a display visible to the user, comprising:
   (a) determining the user's geographic position with a locating device, wherein the geographic position is within a region having constant geographic boundaries;
   (b) calculating a virtual position as a function of the user's geographic position;
   (c) plotting the virtual position on said display visible to the user, wherein the region corresponds to a fixed zone of the display, said zone having constant boundaries corresponding to the constant geographic boundaries of the geographical region; and
   (d) defining the constant geographic boundaries;
wherein the definition of the constant geographic boundaries of the region further comprises:
   (e) placing the user at a first geographic orientation point within the region;
   (f) determining the geographic position of the user at the first geographic orientation point;
   (g) placing the user at a second geographic orientation point within the region;
   (h) determining the geographic position of the user at the second geographic orientation point;
   (i) calculating a first virtual orientation point as a function of the first geographic orientation point; and
   (j) calculating a second virtual orientation point as a function of the second geographic orientation point.

21. The method of claim 20, wherein the region is polygonal, further comprising:
   (a) placing the user at a set of at least one additional geographic orientation point;
   (b) determining the geographic position of the user at each of the additional geographic orientation points;

(c) calculating an additional virtual orientation point as a function of each of the geographic positions of each additional geographic orientation point;

(d) defining the region as a polygon having vertices corresponding to each of the first, second, and additional geographic orientation points; and (e) defining the fixed zone as a polygon having vertices corresponding to each of the first, second, and additional virtual orientation points.

22. The method of claim 20, wherein the region is an equilateral polygon, further comprising:

(a) defining the region as the equilateral polygon, wherein the first geographic orientation point corresponds to a regional polygonal vertex, and wherein the second geographic orientation point corresponds to a regional polygonal center; and (b) defining the fixed zone as the equilateral polygon, wherein the first virtual orientation point corresponds to a zonal polygonal vertex, and wherein the second virtual orientation point corresponds to a zonal polygonal center.

23. The method of claim 20, wherein the region is circular, further comprising:

(a) defining the region as a circle wherein the center of the region is the first geographic orientation point and the circumference of the region comprises the second geographic orientation point; and (b) defining the fixed zone as a circle wherein the center of the zone is the first virtual orientation point and the circumference of the zone comprises the second virtual orientation point.

24. The method of claim 20, wherein the region is rectangular, further comprising:

(a) placing the user at an additional geographic orientation point;

(b) determining the geographic position of the user at the additional geographic orientation point;

(c) calculating an additional virtual orientation point as a function of the geographic position of the additional geographic orientation point;

(d) defining the region as a rectangle wherein a first regional vertex is the first geographical orientation point, wherein a second regional vertex is the second geographical orientation point, and wherein a third regional vertex is the additional geographical orientation point; and (e) defining the fixed zone as a rectangle wherein a first zonal vertex is the first virtual orientation point, wherein a second zonal vertex is the second virtual orientation point, and wherein a third zonal vertex is the additional virtual orientation point.

25. A method of representing a position of a user on a display visible to the user, comprising:

(a) determining the user's geographic position with a locating device, wherein the geographic position is within a region having constant geographic boundaries;

(b) calculating a virtual position as a function of the user's geographic position;

(c) plotting the virtual position on said display visible to the user, wherein the region corresponds to a fixed zone of the display, said zone having constant boundaries corresponding to the constant geographic boundaries of the geographical region; and (d) defining the constant geographic boundaries; wherein the definition of the constant geographic boundaries of the region further comprises:

(e) representing a virtual reference point on the display, wherein the virtual reference point corresponds to a geographic reference point known to the user;

(f) specifying on the display a first virtual orientation point;

(g) calculating a first geographic orientation point as function of the first virtual orientation point;

(h) specifying on the display a second virtual orientation point; and (i) calculating a second geographic orientation point as function of the first virtual orientation point.

26. The method of claim 25, wherein the region is polygonal, further comprising:

(a) specifying on the display a set of at least one additional virtual orientation point;

(b) calculating an additional geographic orientation point as a function of each of the additional virtual orientation points;

(c) defining the region as a polygon having vertices corresponding to each of the first, second, and additional geographic orientation points; and (d) defining the fixed zone as a polygon having vertices corresponding to each of the first, second, and additional virtual orientation points.

27. The method of claim 25, wherein the region is an equilateral polygon, further comprising:

(a) defining the region as the equilateral polygon, wherein the first geographic orientation point corresponds to a regional polygonal vertex, and wherein the second geographic orientation point corresponds to a regional polygonal center; and (b) defining the fixed zone as the equilateral polygon, wherein the first virtual orientation point corresponds to a zonal polygonal vertex, and wherein the second virtual orientation point corresponds to a zonal polygonal center.

28. The method of claim 25, wherein the region is circular, further comprising:

(a) defining the region as a circle wherein the center of the region is the first geographic orientation point and the circumference of the region comprises the second geographic orientation point; and (b) defining the fixed zone as a circle wherein the center of the zone is the first virtual orientation point and the circumference of the zone comprises the second virtual orientation point.

29. The method of claim 25, wherein the region is rectangular, further comprising (a) specifying on the display an additional virtual orientation point;

(b) calculating an additional geographic orientation point from the additional virtual orientation point;

(c) defining the region as a rectangle wherein a first regional vertex is the first geographical orientation point, wherein a second regional vertex is the second geographical orientation point, and wherein a third regional vertex is the additional geographic orientation point; and (d) defining the fixed zone as a rectangle wherein a first zonal vertex is the first virtual orientation point, wherein a second zonal vertex is the second virtual orientation point, and wherein a third zonal vertex is the additional virtual orientation point.

30. A method of representing a position of a user on a display visible to the user, comprising:

(a) determining the user's geographic position with a locating device, wherein the geographic position is within a region having constant geographic boundaries;

(b) calculating a virtual position as a function of the user's geographic position;
(c) plotting the virtual position on said display visible to the user, wherein the region corresponds to a fixed zone of the display, said zone having constant boundaries corresponding to the constant geographic boundaries of the geographical region;
further comprising recording a virtual path of the user's virtual position over time;
further comprising:
(d) calculating a statistic based on the user's virtual path; and
(e) communicating the statistic to the user;
(f) wherein the statistic is selected from the group consisting of: average speed, distance traveled, net velocity, instant speed, instant velocity, maximum speed, average acceleration, maximum acceleration, duration of maximum speed, duration of maximum velocity, and duration of maximum acceleration.

31. A method of representing a position of a user on a rectangular display, comprising:
(a) locating the user at a first corner of a rectangular region having constant geographic boundaries;
(b) determining with a GPS receiver the geographic location of the user as a first geographic boundary point;
(c) relocating the user to a second corner of the region;
(d) determining the geographic location of the user with a GPS as a second geographic boundary point;
(e) relocating the user to a third corner of the region;
(f) determining with a GPS receiver the geographic location of the user as a third geographic boundary point;
(g) calculating a first virtual boundary point as a function of the first geographic boundary point;
(h) calculating a second virtual boundary point as a function of the second geographic boundary point;
(i) calculating a third virtual boundary point as a function of the third geographic boundary point;
(j) defining the edges of the display as a rectangle, wherein a first display corner corresponds to the first virtual boundary point, a second display corner corresponds to the second boundary point, and wherein the first display corner is not adjacent to the second display corner;
(k) generating a linear x-axial regression between longitude coordinate and a virtual X coordinate, wherein the virtual X coordinate is a function of the longitude coordinate;
(l) generating a linear y-axial regression between latitude coordinate and a virtual Y coordinate, wherein the virtual Y coordinate is a function of the latitude coordinate;
(m) determining the user's latitude coordinate and the user's longitude coordinate with a GPS, wherein the user is within the region;
(n) calculating the user's virtual X coordinate according to the x-axial regression;
(o) calculating the user's virtual Y coordinate according to the y-axial regression; and
(p) plotting the user's virtual position on the display at the user's virtual X coordinate and the user's virtual Y coordinate.

32. A system for representing a position of a user in a region having constant geographical boundaries on a bounded display, comprising:
(a) a display visible to the user;
(b) a display controller capable of rendering a virtual position of the user on the display;
(c) a locating device for determining a geographic position of the user; and
(d) a processor in communication with the locating device wherein the processor is programmed to perform the steps of the method of claim 1.

* * * * *